D. H. ROLLER.
SCOOPING DEVICE.
APPLICATION FILED JAN. 24, 1911.
1,016,711.
Patented Feb. 6, 1912.
2 SHEETS—SHEET 1.
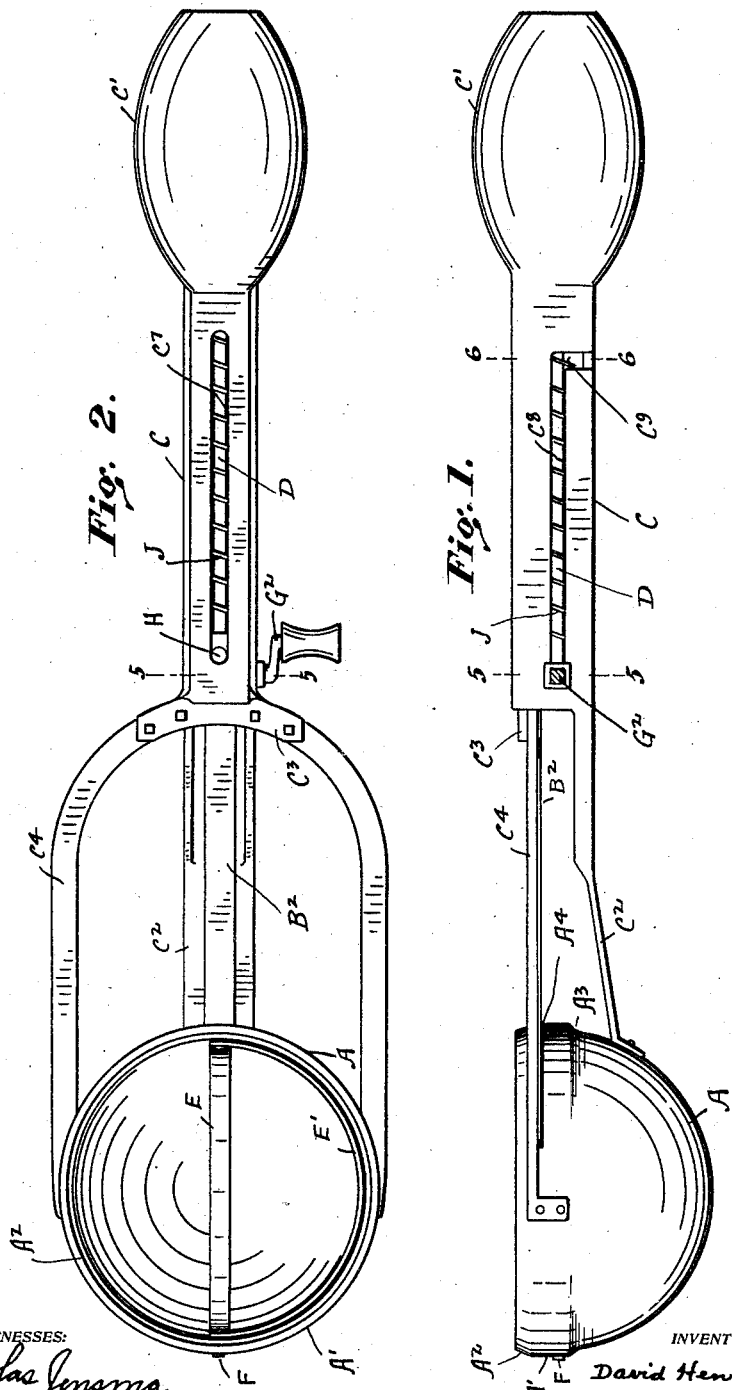
WITNESSES:
Nicholas Jenoma
Edna G. Gentry.
INVENTOR
David Henry Roller
BY
Thomas L. Ryan
ATTORNEY D. H. ROLLER.
SCOOPING DEVICE.
APPLICATION FILED JAN. 24, 1911.
1,016,711.
Patented Feb. 6, 1912.
2 SHEETS—SHEET 2.
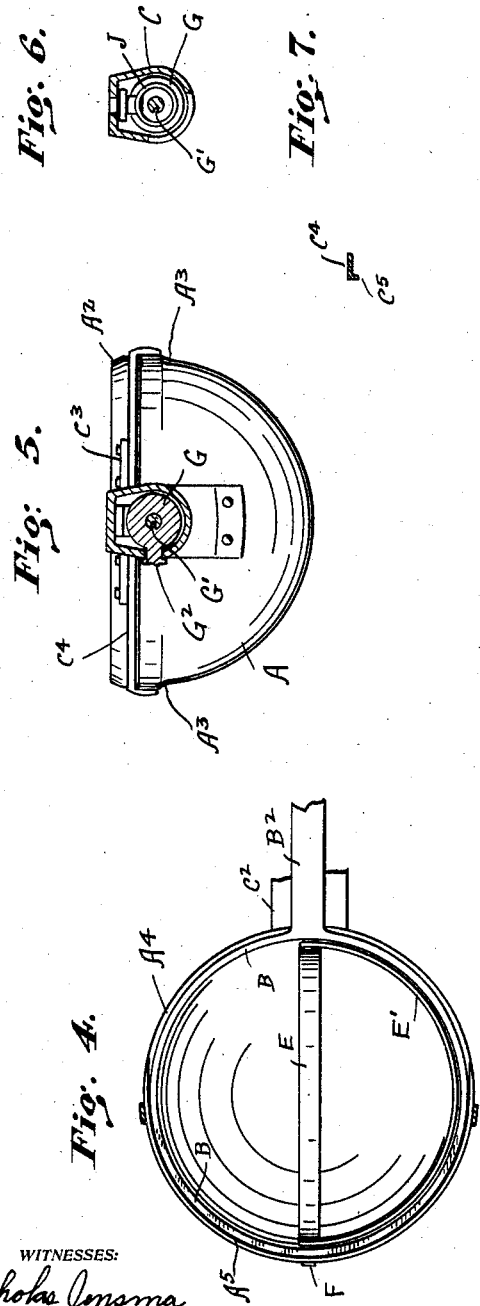
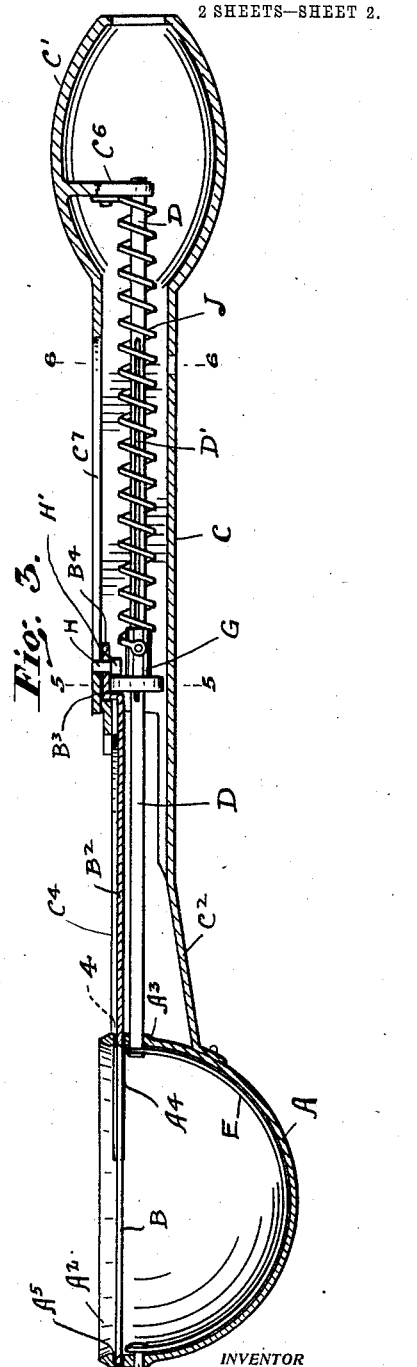
WITNESSES:
Nicholas Jonsma
Edna G. Gentry
INVENTOR
David Henry Roller,
BY
Thomas L. Ryan
ATTORNEY

UNITED STATES PATENT OFFICE.

DAVID HENRY ROLLER, OF MUNCIE, INDIANA.

SCOOPING DEVICE.

1,016,711.  Specification of Letters Patent.  Patented Feb. 6, 1912.

Application filed January 24, 1911. Serial No. 604,371.

*To all whom it may concern:*

Be it known that I, DAVID HENRY ROLLER, a citizen of the United States, residing at Muncie, in the county of Delaware and State of Indiana, have invented certain new and useful Improvements in Scooping Devices, of which the following is a specification.

This invention has reference to scooping-devices intended for use in the dispensing of semiplastic food and confectionery products such as butter, or lard, or salads and the like, and cream confections, ices, sherbets, ice creams and similar products.

The invention which forms the subject of this application, being intended especially for the dispensing of products having large market at retail in small and specific quantities, it will be referred to in the following description as being used in the dispensing of ice cream, it being understood that the device is of equal utility in the dispensing of products having the nature and characteristics of the others above mentioned.

I am aware that scoop devices of the character referred to in this specification have been heretofore made, and in the use of which the ice cream may be scooped out in substantially the quantity desired and may then be severed with more or less facility from the scoop receptacle.

Objects of my invention are to improve the design and construction of such devices and to provide a scooping device of this character capable of being effectively operated by the user's one hand, and whereby the scoop may readily cut its way into and become filled with the ice cream, and whereby the quantity so gathered will be evenly and uniformly measured, and may then be quickly severed from the receptacle.

My present invention is embodied in and its objects are accomplished by the new combination, construction and arrangement of parts shown in the accompanying drawings. The invention includes a cup shaped receptacle, a scraper to traverse its internal surface, a handle member for the receptacle, a knife to pass across the top of the receptacle, and means carried by the handle member and having connections with the said knives whereby the user may with one hand manipulate the invention to fill the receptacle, strike off the overplus, and then sever from the receptacle, the charge so gathered.

The several parts of this improved scooping device are designated by similar characters of reference applied thereto in the accompanying drawing, in which—

Figure 1 is a side view, the hook $G^2$ being broken off. Fig. 2 is a plan view of the invention. Fig. 3 is a longitudinal vertical central sectional view. Fig. 4 is a sectional plan view taken on the line 4—4 in Fig. 3. Fig. 5 is a transverse sectional view taken on the line 5—5 in Fig. 1 and Fig. 3, the hook $G^2$ being broken off. Fig. 6 is a transverse sectional view taken on the line 6—6 in Fig. 1 and in Fig. 3. Fig. 7 is a transverse sectional view of the steel fork $C^4$.

The receptacle A is of hemispherical form as shown, its rim $A^1$ being thickened and finished to sharpened edge $A^2$. The lower portion of this rim slopes by an easy bevel $A^3$ into the body portion of the receptacle. The advantages of having this rim of the increased thickness and with pointed edge and of contour as shown are two fold,—a receptacle so constructed will cut or make its way readily into the ice cream, the pointed thickened rim acting as a pilot to open the way for the body portion of the receptacle. Moreover the receptacle is of substantial strength at its rim to constitute a housing for the strike off knife, and a bearing for the scraper member which will be presently described.

B designates a strike off knife whose function is to cut off at a certain plane near the top of the receptacle, the substance or material with which the receptacle has been filled. The construction and arrangement of this strike off knife so that it may be operated to move across the receptacle opening, and which knife will at the same time not obstruct the opening or internal surface of said receptacle, are features of my invention. This strike off knife consists of a flat steel ring having internal diameter the same as that of the internal diameter of the receptacle, and whose external diameter is such that the said ring will readily pass through the horizontal slot $A^4$ in the rear side of the receptacle, and will come to rest in the internal semi annular recess $A^5$ in the front side of the receptacle. The frontal half of the said steel ring has a beveled edge. Formed integral with the rear side of said ring is the stem $B^2$ whose rear end is adapted to work slidingly in the handle member C. This handle member C is of hollow construction and has the form in cross section as shown in Fig. 5; its rear end $C^1$ is of bulb like form and capable of being firmly grasped by the hand. The extended lower portion C² is secured to the bowl portion of the receptacle. The upper and forward portion of the handle member consists of a cast or a pressed steel fork C⁴ the forward ends of which are secured to the sides of the receptacle A. This fork, having its outer edges provided with flange C⁵ as shown in cross section view at Fig. 7, constitutes a guideway and shield for the strike off knife B. This fork is held in correct alinement by being secured at its rear portion to the ears C³ of the handle member.

D designates a shaft that has its front end journaled in the rim of the receptacle A at a plane underneath that of the strike off knife. The rear end of this shaft is journaled in a lug C⁶ of the handle member. Adapted to traverse the internal surface of the receptacle is a severing member the function of which is to sever the ice cream from the receptacle so that same may be easily discharged therefrom. This severing member consists of a double scraper made of two similar curved strips or thin metal bars E and E¹ having their ends secured together at right angles to each other and forming terminals or heads. One head of this scraper is secured to the front end of the shaft D, and the other head is secured to a stud F which will work pivotally in the frontal portion of the receptacle rim.

Extending longitudinally of the shaft D is a groove D¹. Slidingly disposed on the shaft D is a cross head G which has a tooth G¹ to engage the groove D¹. The flange of this cross head is of a diameter suitable to move freely inside of the handle member and to engage loosely the stem of the strike off knife. As shown in Fig. 3 the rear end of the stem is bent at an angle so that an abutment B³ for the flange of said cross head is formed. The end B⁴ of the stem will move freely underneath the top side of the handle which is provided with a central longitudinal slot C⁷. H designates a stud carried by the end B⁴ of the said stem. The head H¹ of this stud also forms an abutment against which the flange of the cross head will work. A strong coil spring J has its one end so secured to the cross head and its other end so secured to the lug C⁶ that the cross head will be sustained normally at the forward position, the strike off knife being at the position as shown in Fig. 3; and the scraper will be held at position as shown in Fig. 3 and in Fig. 4.

Extending from the cross head G is a hook G² which will pass through and be free to move longitudinally in the slot C⁸ in the side of the handle member. The rear end C⁹ of the said slot is turned at a right angle whereby it is possible to turn the cross head rotatively after it has been retracted to the limit of its rearward travel. The function of the coil spring is to return the scraper to normal position and then to shoot the strike off knife forwardly to its normal position. The several parts of my invention will be easily assembled, there is comparatively little machining of same required, and the device will be durable, and not liable to get out of repair or adjustment.

To operate a scoop of this character it is grasped by the user's hand and thrust into the ice cream and withdrawn. The charge of the cream extracted from the supply is of bulk to overtop the receptacle. With ordinary scooping devices this overplus is not struck off but the entire quantity so gathered is dispensed. Now, in the practice of my invention this overplus is struck off and the amount to be dispensed is measured or rendered uniform. In operating this improved scooping device it is passed into the bulk of ice cream in the usual way and a charge of the cream is gathered; in withdrawing same the user engages the hook G² by his thumb and in retracting the hook the strike off knife is operated, the overplus of cream being struck off or severed, leaving a predetermined amount in the receptacle. The hook G² upon being turned down at the slot C⁹ operates the scraper whereby the internal surface of the receptacle is traversed by the scraper, which severs the charge of cream from the receptacle and same is free to be discharged therefrom when the receptacle is inverted. It being necessary to move the strike-off knife before the scraper is operated, the dependability of the device is to be relied upon, the advantages being that an accurate measurement of the ice cream is assured, even though the device may be handled by a careless or inexperienced person. The amount or quantities dispensed will be of definite measure, the customer will receive full value, and there will be corresponding economy and prevention of loss and waste to the seller.

In the handling of nut and fruit cream, the utility of the device is further demonstrated in the fact that the strike-off knife constructed and arranged as shown, will pass through same easily and effectively. The fork C⁴, besides serving as a stout connection between the receptacle and the handle proper, also shields the strike-off knife from contact with outside objects, thereby preventing the knife from becoming unsanitary.

In this specification and illustration of my invention has been shown the preferred general form and arrangement of parts for carrying my invention into effect; it will be understood that minor changes may be made in the device and its several parts within the scope of the invention, as defined by the appended claims without departing from the nature of the invention, or sacrificing any of the advantages.

What I claim as my invention, and desire to secure by Letters Patent, is:

1. The combination of a receptacle, a handle member, a cutter to move across the opening in said receptacle and having a stem, a scraper to traverse the internal face of the receptacle, a journaled shaft arranged longitudinally of the handle member and having its front end secured to one end of the scraper, a cross head carried slidingly but held against rotation on the said shaft and adapted to loosely engage the stem of the cutter, an arm connected to the cross head, a coil spring between the cross head and the handle member to urge the cutter to extended position and to urge the shaft in a rotative direction.

2. The combination of a receptacle, a hollow handle having a slot in its top and a second slot in its side the rear end of said slot being turned at a right angle, a cutter to move across the opening of said receptacle and having a stem to move on the interior of said handle there being an offset near the end of said stem, a stud near the said offset its upper end to engage the first named slot and its lower end to form a head, a scraper to traverse the internal surface of the receptacle, a journaled shaft arranged longitudinally of the handle and having its front end secured to the end of the scraper a cross head carried slidingly but held against rotative movement on said shaft and adapted to work between the offset in the stem and the head of said stud, an arm connected to the cross head and adapted to move slidingly in the last named slot in the handle, a coil spring having its one end connected to the cross head and its other end connected to the handle.

3. In a device of the kind described, a receptacle having a thickened rim provided with an angular edge, a semi-annular slot in said rim, a semiannular recess on the internal face of the other side of said rim, a ring shaped cutter to move through said slot and to project into said recess, a handle member for said receptacle, means carried by the handle and having connections with the cutter whereby the cutter may be operated to extended and retracted positions.

4. In a device of the kind described, a receptacle having a thickened rim provided with an angular edge, a semiannular slot in said rim, a semiannular recess on the internal face of the other side of said rim, a ring shaped cutter to move through the said slot and to project into said recess, a handle member for said receptacle, a scraper to traverse the internal surface of the receptacle its ends being pivoted in the walls of said recess at locations underneath the plane of the cutter, means carried by the handle and having connections with the cutter and the scraper whereby the cutter and the scraper may be operated substantially as described.

5. In a device of the kind described, the combination of a hemispherical receptacle, a semiannular slot in the rim thereof, a semiannular recess on the internal face of the other side of said rim, a ring shaped cutter to move through the said slot and to project into the said recess, a handle member for the said receptacle, connections between the handle and the receptacle including a guide-member for said cutter, a scraper to traverse the internal surface of the receptacle, means carried by the handle and having connections with the cutter and the scraper whereby the cutter and the scraper may be operated.

In testimony whereof I affix my signature in presence of two witnesses.

DAVID HENRY ROLLER.

Witnesses:
Thomas L. Ryan,
John F. Ireland.

Copies of this patent may be obtained for five cents each, by addressing the "Commissioner of Patents, Washington, D. C."